April 7, 1959 S. HILLER ET AL 2,880,524
APPARATUS FOR CONTACTING SOLIDS WITH GASES
Filed May 14, 1956 5 Sheets-Sheet 1

INVENTORS
STANLEY HILLER
QUINTIN R. STAUFFER

BY Fryer + Johnson
ATTORNEYS

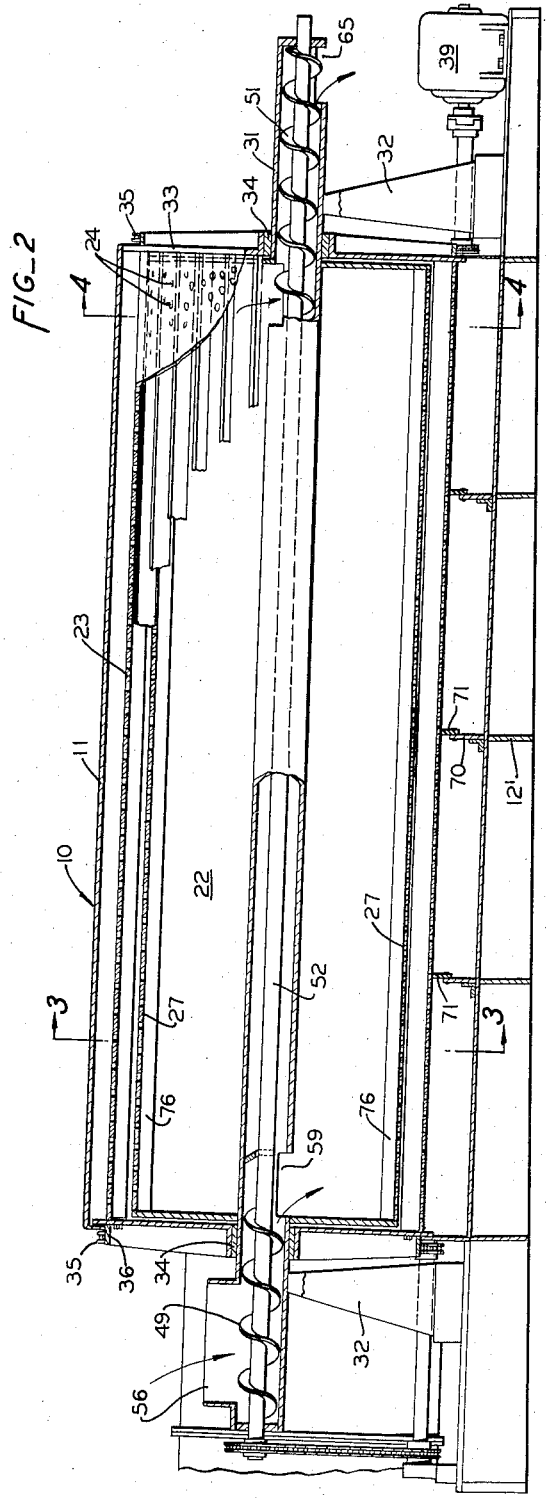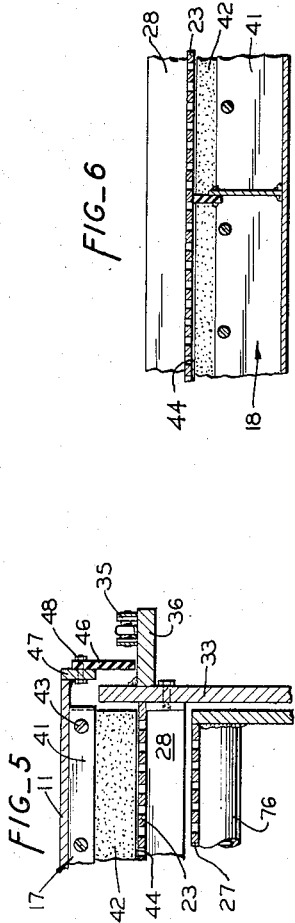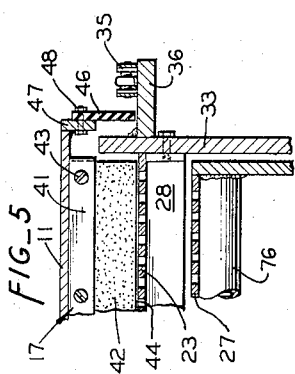

April 7, 1959
S. HILLER ET AL
2,880,524
APPARATUS FOR CONTACTING SOLIDS WITH GASES
Filed May 14, 1956
5 Sheets-Sheet 3
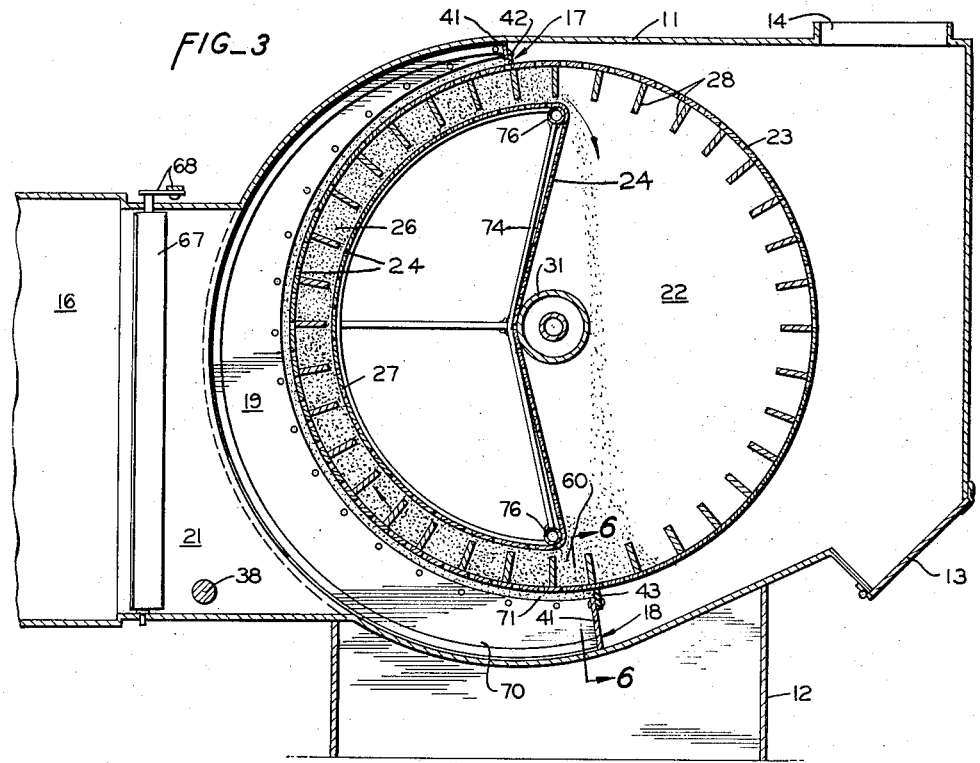
FIG_3
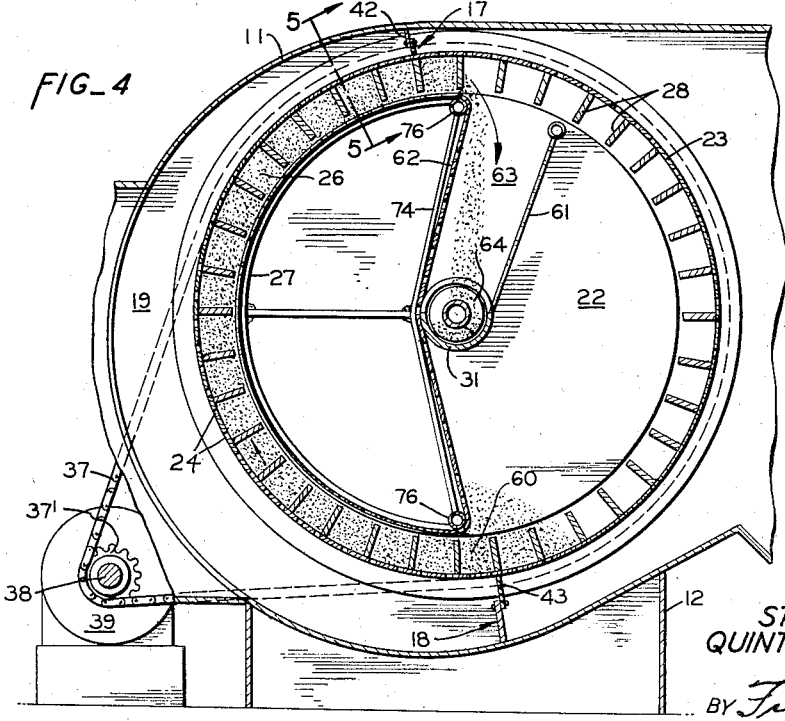
FIG_4
INVENTORS
STANLEY HILLER
QUINTIN R. STAUFFER
BY Fryer & Johnson
ATTORNEYS

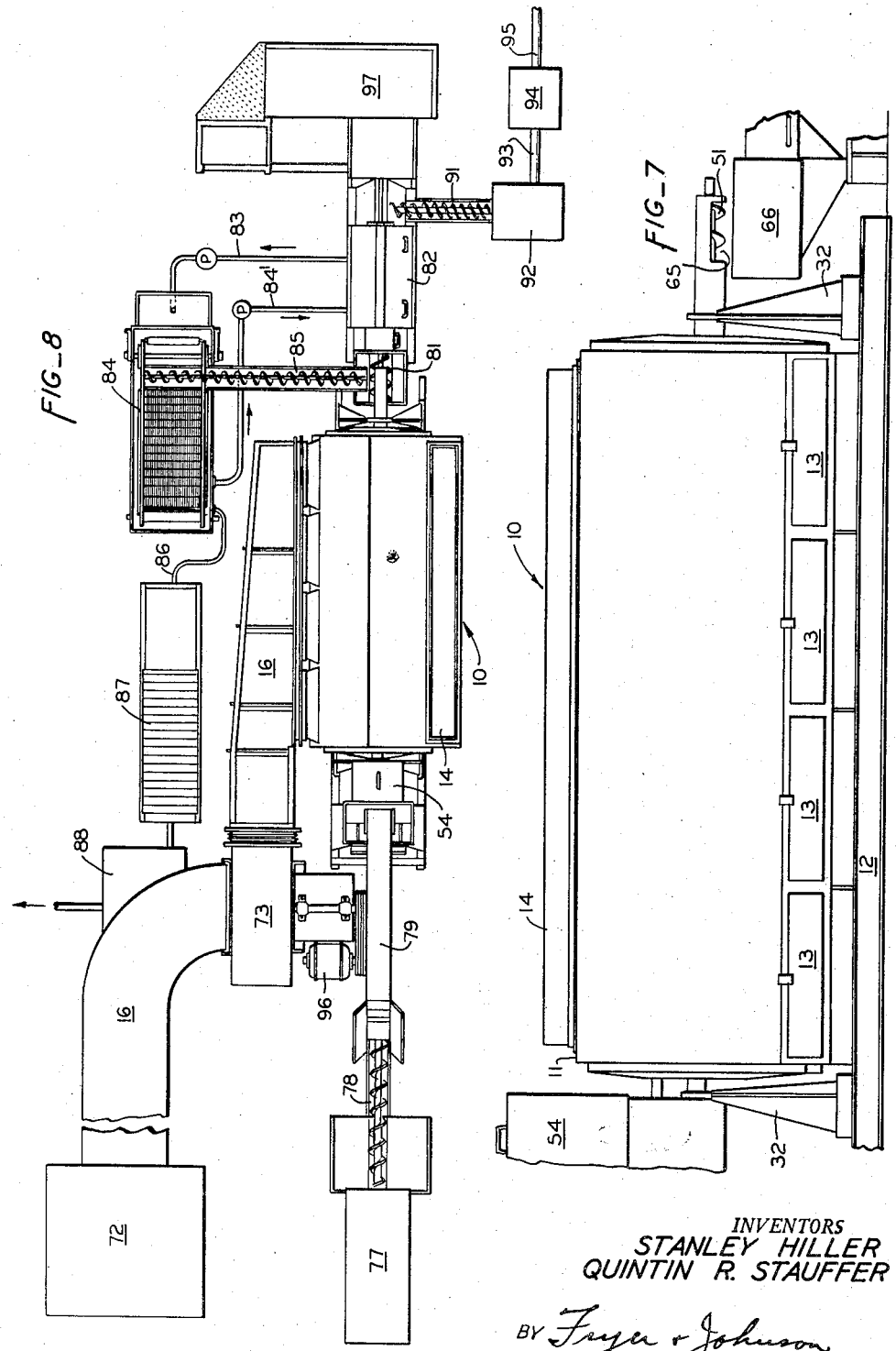

April 7, 1959 S. HILLER ET AL 2,880,524
APPARATUS FOR CONTACTING SOLIDS WITH GASES
Filed May 14, 1956 5 Sheets-Sheet 5
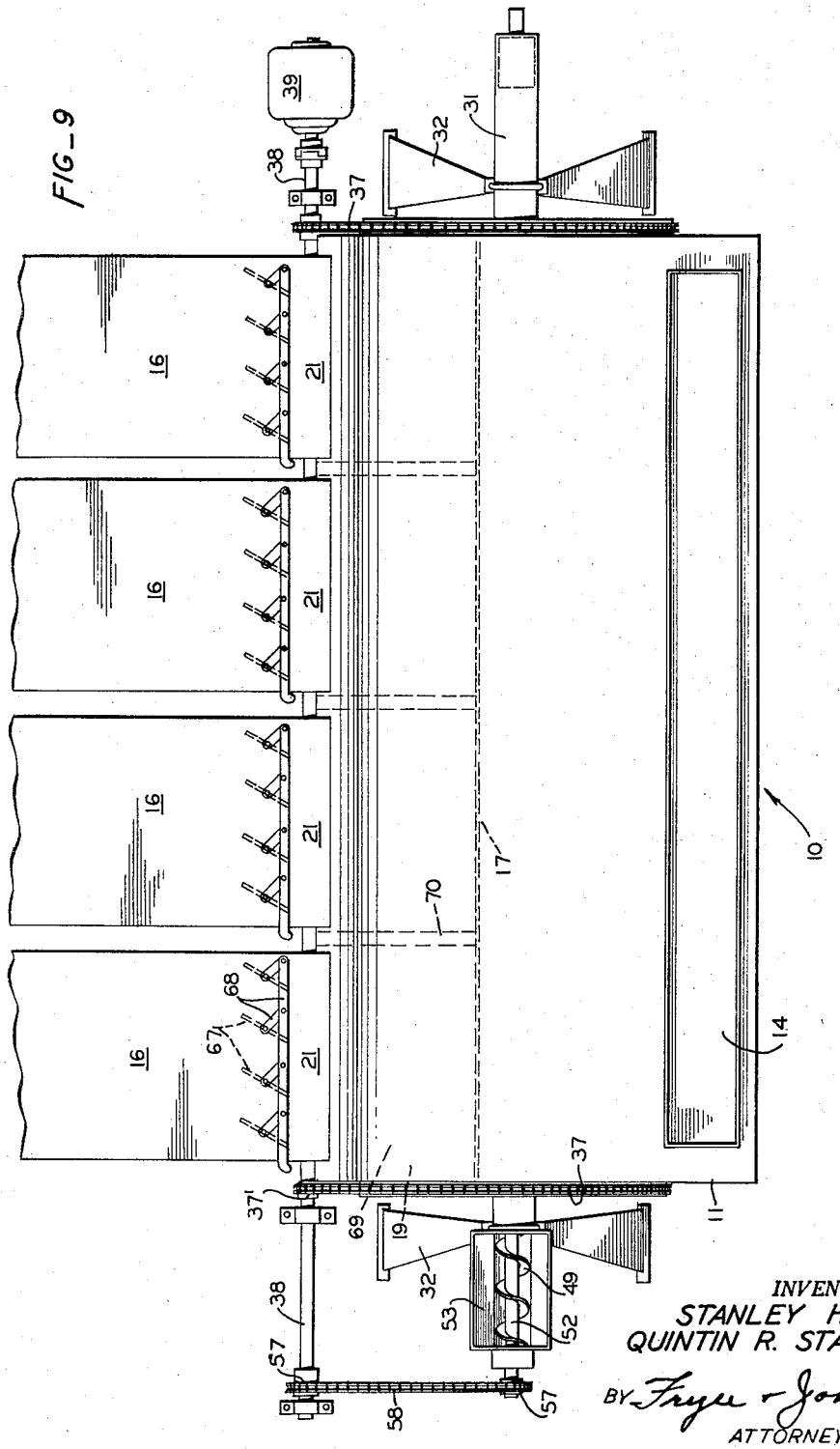
INVENTORS
STANLEY HILLER
QUINTIN R. STAUFFER
BY Fryer & Johnson
ATTORNEYS

United States Patent Office 2,880,524
Patented Apr. 7, 1959

2,880,524

APPARATUS FOR CONTACTING SOLIDS WITH GASES

Stanley Hiller, Berkeley, and Quintin R. Stauffer, El Cerrito, Calif.; said Stauffer assignor to said Hiller Application May 14, 1956, Serial No. 584,726

2 Claims. (Cl. 34—102)

This invention relates generally to the contacting of solids with gases to effect heating, drying or cooling of either the solids or gases or to effect reactions between solids and gases, or for a combination of the foregoing purposes. More particularly, the invention is for apparatus and method for contacting relatively light or fragile solids, which may be subdivided solids, which cannot be effectively contacted with gases in accordance with previously known methods and apparatus, except at relatively low capacities, without excessive abrasion and decrepitation of the solids or excessive dust losses, or both.

In the contacting of solids with gases, it is well known that the greater the solid surface area presented to the gases per unit of solids volume, the greater the efficiency of contact between solids and gases. It has long been the practice to grind, slice or otherwise subdivide solids to reduce their size and thus increase the solid surface area per unit volume of solids presented to a flowing gas stream.

Heretofore, various methods and apparatus have been employed to insure efficient contact between such subdivided solids and gases. One such method employs a modified form of the well known cylindrical rotary kiln or dryer in which the kiln is provided with gas admitting tuyeres on its periphery so that as it rotates, air or other gas is blown through the solids to subject them to contact by the flowing gas stream. Such a procedure does increase the efficiency of contact between solids and gases, but is still not all that is to be desired due to the fact that the passage of gas through solids reposing in the lower portion of the cylinder is non-uniform. This is so because in any cylindrical member having its longitudinal axis generally horizontal, the solids will normally define a bed therein of uneven depth corresponding generally to a section of a circle defined by a chord. Thus, the depth of such a bed is substantially less at the sides than it is at its center and so the least resistance to gas flow is at the sides. The result is that a majority of gases pass through the bed at the sides rather than the center. This results in a non-uniform contacting and also in increased gas velocities near the sides of the bed which contribute to excessive dust losses due to entrainment of solids in the gas stream.

Another well known method for contacting solids with gases is the so-called solids-fluidization procedure in which a mass of subdivided solids enclosed in a reaction chamber is rendered into a dense turbulently mobilized suspension of solids by the action of a gas stream passing upwardly through the mass of solids at solids-fluidizing velocities. Such a suspension is referred to as a fluidized bed because it possesses many of the physical characteristics of water in that it will exert fluidstatic pressure, will flow just as a liquid does, and in appearance resembles boiling water. This method has been successful in increasing the efficiency of contact between solids and gases. It has been utilized for heating, cooling or reacting solids and has met with wide success because the intimate contact with relatively large volumes of gases enables high capacity operation. However, the procedure possesses some limitations that render it commercially impractical for treating certain types of solids. This is so because, in common with the above discussed modified rotary kiln dryer, it subjects the solids to a constant grinding action due to the continuous relative motion or turbulence of individual particles. Because of such turbulence, fragile solids are likely to be broken into smaller sizes which will contribute to dust losses and which also may be undesirable for reasons connected with further processing of such solids.

A further problem experienced in connection with both the solids-fluidization procedure and the above discussed modified rotary kiln procedure in which gases are passed through the mass of solids in a rotary kiln, is that the velocity of the gases passing through the solids must be kept sufficiently low to prevent them from carrying away a large portion of solids having relatively low specific gravities or which are subdivided in such a manner that they are especially amenable to entrainment in gas streams. An example of this latter would be material, such as coconut meat, which is sliced into relatively thin elongated slices for drying prior to extraction of its oil.

To avoid excessive dust loss and abrasion in such prior methods, the gas velocities are kept relatively low. However, lower gas velocities are undesirable because gas velocity is a direct measure of gas quantity per unit of time which is in turn a direct measure of the quantity of solids which can be treated in such unit of time, thus any gas velocity reduction in a given unit results in an undesirable corresponding reduction in the solids treating capacity of such unit.

The present invention has, among its objects, the provision of a method and apparatus for treating subdivided solids which overcome the above noted problems of abrasion and dust loss, yet present the desirable feature of efficient high capacity contact between gases and solids.

In brief, the invention provides a method of contacting subdivided solids with gases in which such solids are passed through a confining section defined between spaced apart perforated or otherwise gas-permeable confining walls and during such passage are contacted with gases, thence released from confinement, tumbled, reconfined and recontacted with gases until the desired treatment is finished. This method, by confining the solids, except for intermittent tumbling, eliminates excessive turbulence and abrasion of the solids yet enables the use of high velocity gases with consequent high capacity operation without high dust losses.

To carry out the above method, the invention provides a reaction chamber, which for purposes of convenience is hereinafter principally referred to as a dryer, but which may be utilized for any contacting of solids with gases. The dryer of the invention provides for the maintenance of a confined uniform depth mass of solids in which the solids are uniformly contacted by a transversely flowing gas stream passing through the mass at relatively high velocities without creating significant turbulence or entraining an excessive amount of solids.

The invention further provides for intermittent tumbling of the solids to stir them and insure presentation of new surfaces to the uprising gas stream, such tumbling being conducted in a particular manner so that the desirable intermittent stirring of the solids is effected with minimum undesirable abrasion of solids.

In summary then, the apparatus invention hereof presents a dryer comprising an elongated treatment chamber, an inlet for solids at one end of the chamber and an outlet for solids at the opposite end of the chamber, means in the chamber for accepting solids fed thereinto and for confining them in a bed of predetermined depth in a solids confining section, and while they are in such bed, for passing a stream of treatment gas through the mass of solids, the treatment gas being supplied through a suitably located plenum space in communication with the chamber through a gas permeable wall defining one side of the confining section.

In accordance with a feature of the invention, after the solids have been contacted with the gas stream they are released from confinement, tumbled to stir them, then reconfined in the bed for additional contacting with the gas stream. This is an important feature because it provides for maintaining the confined bed substantially full of solids at all times, even though the material undergoes considerable shrinkage during the treatment. That is to say, in certain processes, particularly drying, the solids reduce in volume as they progress through the reactor and the bed might become shallower with consequent less gas resistance thereby contributing to non-uniform gas flow. However, by repeatedly releasing the solids from confinement then adding to them more solids before reconfinement, it is insured that the bed of solids is substantially uniform in depth throughout the entire reactor, a supply of such additional solids being always available because, as hereinafter discussed, there are always more solids in the reactor than those confined in the bed.

Because the mass of solids is, except during tumbling, confined as a bed of uniform depth during contact with the gases, a uniform gas velocity through the bed and, therefore, uniform contacting of solids, is insured. Moreover, since the mass of solids is confined, which term as used herein refers to confinement at the top as well as at the bottom and sides, they are held in the bed and prevented from becoming turbulently fluidized or entrained by the gases.

In accordance with a further feature of the invention, means for tumbling or stirring the solids after release from the bed is provided by which solids are contacted during tumbling by gases that have already passed through the uniform depth bed or mass of solids in the confining section. Thus, the gases are utilized to contact solids more thn once during their passage through the dryer thus further increasing efficiency of operation.

In a preferred embodiment of the invention, an elongated generally horizontal tubular, desirably cylindrical, chamber is employed as the treatment zone. Gases are introduced into the chamber from a plenum space or wind box mounted alongside and in communication with such chamber for substantially its entire length and for about one half of its periphery. The cylindrical chamber is provided with a gas-permeable outer wall which permits gases to pass from the plenum space into the chamber. Such wall may be conveniently made of wire screen with suitable size openings, or it may be of perforated metal or ceramic material, depending upon the use and temperatures to which the equipment is to be subjected. A second gas permeable wall of substantially the same length as the first wall is provided in the cylindrical chamber spaced inwardly of and generally parallel to the first wall and co-extensive therewith for a portion of the periphery of such first wall, thereby defining a confining space between the two walls. The space thus defined extends substantially the length of the chamber, and around its periphery a distance at least equal to the area of communication with the plenum space. Means, such as a series of spaced apart longitudinally extending lifters, are provided which are adapted to engage solids and convey them through the confining space and across the area of communication with the plenum space. Since solids are contained between the lifters as they pass through the space defined by the concentric walls, they are confined during movement across the plenum space. Gases pass from the plenum space through the gas permeable outer wall into and through the mass of solids in the confined space in a direction substantially transverse to movement of such solids. The gases exit from the confining section through the inner concentric wall. Since the solids are confined, the gases cannot cause them to become turbulently fluidized as above described nor entrain and carry them from the confined chamber.

In the embodiment of the invention illustrated in the drawings, solids enter the confining space and are passed across the open mouth of the plenum space, thence are conveyed upwardly around the periphery of the chamber and released in an upper portion thereof to fall back by gravity in the form of a shower of such solids to the bottom of the chamber for re-engagement by the lifters and re-cycle through the confined space. As the solids fall or tumble from the top of the chamber to the bottom, they fall transversely through the stream of gases passing to discharge. There is thus provided a second contact between the solids and gases which increases the overall efficiency of operation.

It will be noted that as the solids fall from the upper part of the chamber to the bottom thereof, no attempt is made to confine them, it being desirable that they be free to fall freely by gravity to thereby enhance stirring. In this connection it is noted that the discharging gases perform an additional function in that they aid in stirring the solids prior to reintroduction into the confined area.

As solids are continuously cycled through the confined area, thence stirred and reintroduced into such confined area, they are also moved longitudinally of the chamber either due to the influence of additional solids being introduced at the infeed end of the chamber or by sloping the entire chamber along its longitudinal axis, or by a combination of such means, as will be hereinafter discussed in more detail.

The lifters for moving solids through the confined space may be mounted for rotation independently of either the outer or inner perforated wall. However, it is desirable that they be mounted directly on the outer perforated wall and that such wall be mounted for rotation. This latter arrangement is desirable as it aids in preventing clogging the apertures in such wall. This is so because as the wall rotates around the chamber and passes over a gas outlet, stray solid particles entrained in the outgoing gases may lodge in apertures of such wall, but even so the wall will not bceome permanently plugged because as it rotates further to pass over the plenum space the incoming solids-free gases will pass in reverse direction through the wall and so dislodge any particles that may have been collected in its apertures.

The foregoing and other objects and advantages of the invention will become more apparent from a perusal of the following description of the preferred modification of the invention illustrated in the accompanying drawings forming a part of this specification.

In the drawings:

Fig. 2 is a front view of the reactor shown in Fig. 1, some parts being shown in section and others in elevation for purposes of clarity.

Fig. 3 is a sectional view taken in the plane of line 3—3 of Fig. 2 showing the juxtaposition of various parts within the reactor.

Fig. 4 is a sectional view taken in the plane of line 4—4 of Fig. 2 showing the discharge mechanism of the reactor.

Fig. 5 is a fragmentary longitudinal sectional view taken in the plane of line 5—5 of Fig. 4 showing details of a typical seal at one end of the reactor.

Fig. 6 is a sectional view taken in the plane of line 6—6 of Fig. 3.

Fig. 7 is a partial front elevational view of an assembly including feed bin, reactor and discharge bin.

Fig. 8 is a top elevational view of a coconut processing system embodying the dryer of the invention as a part thereof.

Fig. 9 is a top elevational view of a modified form of reactor useful for special purposes.

Figure 1:
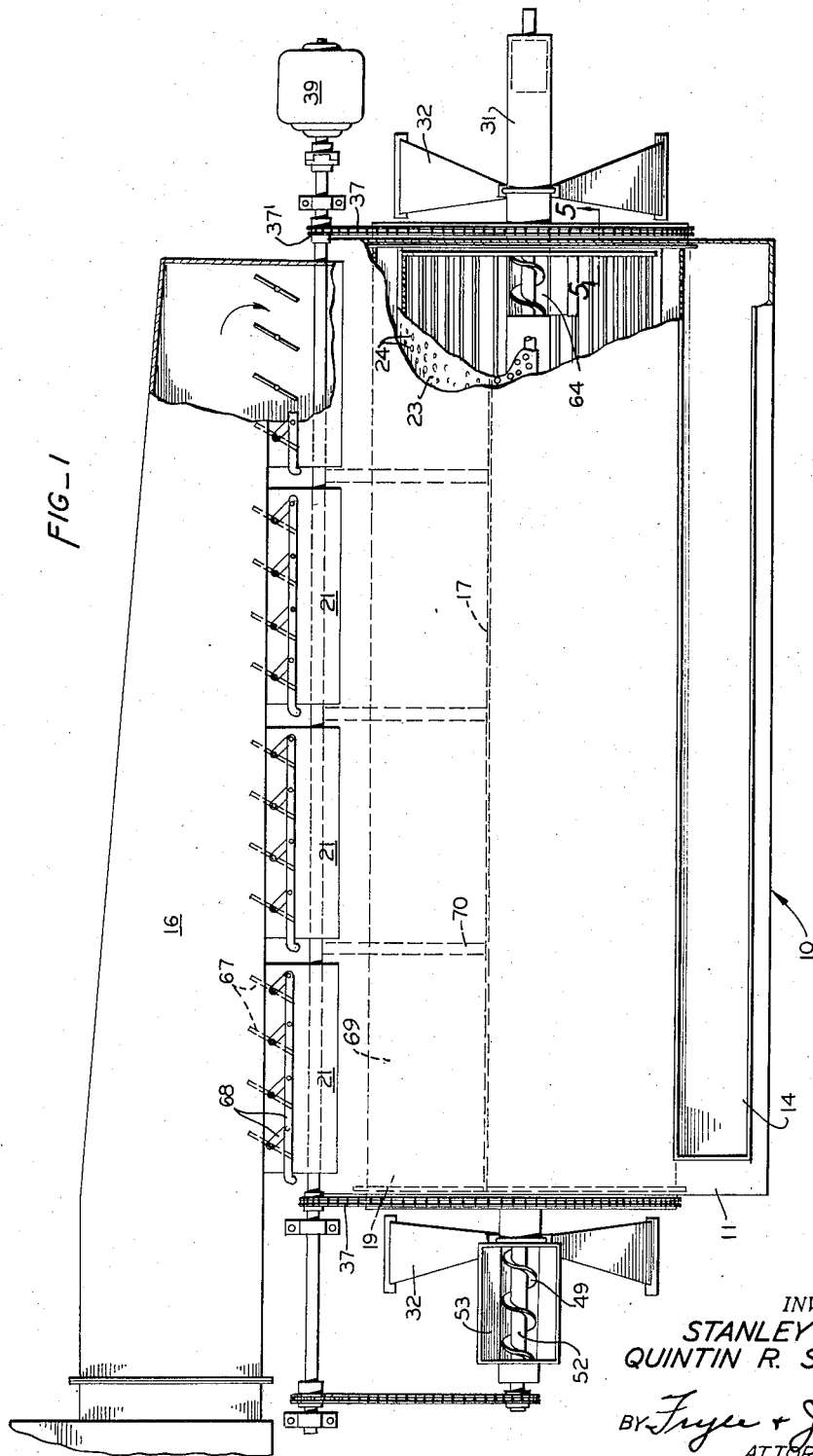
Fig. 1 is a top elevational view of a reactor embodying the invention, certain portions being cut away and some parts being shown in phantom lines for purposes of clarity.

Referring to Figs. 1, 2, 3, 4 and 7, it will be seen that the reactor, generally designated 10, comprises a solid outer shell or housing 11 suitably mounted on supports 12 and 12'. The shell is provided with a clean out hatch 13 for removing fine solids which may collect there. A gas escape port 14 running substantially the length of the shell is also provided to conduct spent gases from the reactor.

At the rear of the reactor, outer shell 11 is in communication with a gas supply manifold or conduit 16 through which treatment gases are supplied to the reactor. As can be best seen in Figs. 1, 3 and 4, outer shell 11, in cooperation with top and bottom sealing plates 17 and 18, respectively, defines a plenum space or wind box 19 running substantially the full length of the reactor and extending around at least one-half of its periphery. Wind box 19 communicates with gas supply conduit 16 through gas inlet ports 21 and with an inner reaction chamber 22 defined by a cylindrical perforated wall 23 through apertures 24.

Gases enter from conduit 16, pass through inlet ports 21 into wind box 19, then through apertures 24 in wall 23 into a confined space 26 defined between wall 23 and an inner perforated wall 27 spaced from and concentric with wall 23 over substantially the same area as the area of communication with wind box 19.

The location and shape of inner wall 27 in relation to outer wall 23 is best shown in Figs. 3 and 4 from which it can be seen that confined space 26 is a relatively shallow uniform size zone defined between the two spaced apart walls and provides for closely confining solids (i.e. so that no substantial expansion or turbulence can occur) as they pass across the wind box 19 in contact with gases passing from such wind box. Since outer wall 23 is cylindrical and inner wall 27 is actually a partial cylindrical member, section 26 may be said to be defined between the inner surface of a cylindrical wall and the outer surface of a concentric partial cylindrical inner wall.

In order to convey solids through confined space 26, a plurality of spaced apart longitudinally extending lifters 28 is provided. Such lifters are mounted for rotation within the reactor and may be suitably mounted for such rotation independently of outer perforate wall 23, or as hereinafter explained may be mounted directly on such outer perforate wall 23 for rotation with such wall. The latter method of operation is preferable as it provides for continuous cleaning of the outer perforate wall during operation. This is due to the fact that as wall 23 rotates toward the gas discharge or front side of the reactor shell 11, discharging gases will pass through such wall from the inside to outside. Consequently, entrained solids may lodge in perforations in the wall thus tending to clog them. However, as wall 23 continues to rotate, it eventually passes over wind box 19 where incoming gases pass through the wall in the reverse direction, from outside to inside, thus tending to dislodge solid particles from such perforations.

In the embodiment of the invention illustrated in the drawings, the solids lifters 28 are attached directly to the outer perforated wall 23 by welding or other suitable means (not shown). In this connection it is to be noted that lifters 28 may be of any suitable material such as light metal or wood, or other material adapted to stand up under the intended use of the dryer.

To accomplish rotation of outer wall 23 and attached lifters 28 inside shell 11, a fixed longitudinally extending hollow shaft 31 is provided and is suitably fixedly supported by support brackets 32 at opposite ends of the reactor. Cylindrical wall 23 is provided with solid end walls 33, and shaft 31 is suitably journaled in such walls in a bearing 34 to provide for rotation of cylindrical wall 23 on fixed shaft 31.

Driving of cylindrical wall 23 and attached lifters 28 is done by means of suitable sprockets 35 on a flange or hub portion 36 extending from end walls 33 and chains 37 driven by small sprockets 37' on a drive shaft 38, which is in turn driven by a suitable motor 39.

To provide a seal at the ends of the reactor and also at the terminal walls of wind box 19, flexible seals or deckles are used (Figs. 3–6). The top and bottom longitudinal terminal walls of wind box 19 are sealed with longitudinal seal members 17 and 18 which comprise rigid metal members 41, and resilient members 42 suitably secured thereto by bolts or rivets 43 in such a manner that the free edges 44 of resilient members 42 bear against the outer surface of cylindrical wall 23 as such wall rotates. This arrangement effectively seals wind box 19 and directs gases through walls 23 into and through confining section 26 thence through inner wall 27 into the interior of the reactor whence it passes through apertures 24 in the opposite portions of such walls and finally discharges via port 14.

A seal against gas escape at each end of the reactor where the driving sprockets are located is provided by cooperation of a deckle strap 46 (Fig. 5) suitably connected to housing 11 by a depending flange 47 and bolts 48. Such deckle strap 46 is desirably of resilient material and forms a seal by bearing against flange or hub portion 36 of solid end wall 33 on which sprocket 36 is mounted.

Feed and discharge of solids is accomplished by conventional screw flights 49 and 51 mounted on a rotatable shaft 52 inside of fixed hollow shaft 31. Incoming solids enter feed hopper 53 from any suitable source, such as a slicer 54 (Fig. 8), drop through an open top portion 56 of feed screw conveyor 49 and are moved by such conveyor, which is driven from drive shaft 38 by sprockets 57 and chain 58, into the reactor. Solids are discharged from conveyor 49 inside the reactor through a downwardly facing opening 59 and fall to the bottom of chamber 22 where they are supported by the inner surface of wall 23 adjacent the lower or infeed side 60 of confined space 26.

As above described, solids are conveyed in an arcuate path through confined section 26 by lifters 28, released from confinement adjacent the top of the reactor and allowed to drop or shower back by gravity to the bottom for recycle through confined section 26. Continuous feeding of solids into the reactor forces solids to progress longitudinally through the reactor. In this connection, it is noted that solids movement longitudinally through the reactor will be greatly improved by mounting the reactor on a slight incline (Fig. 2) thus providing a grade to encourage solids flow. This arrangement also has the advantage of providing a means for completely emptying the reactor of solids merely by allowing it to run after feed has stopped. Inclination of the reactor also gives more positive control over the residence time of solids in the reactor, and means may be provided to vary the inclination of the reactor to accommodate different materials and changing conditions. Although such means are not shown in the drawings, it is to be understood that any suitable jack or other elevating means may be employed to raise or lower the feed end of the reactor as desired. In this connection it will be noted that when the reactor is in full operation, there will be solids therein in quantity sufficient to provide a pile of solids in the reactor bottom to insure that each lifter engages a full load of solids. This extra supply of solids aids in promoting solids flow through the reactor and also, as above noted, insures that the bed will be kept full even through there is considerable shrinkage in volume of the solids. This is so because the extra solids will be available to fill voids caused by shrinkage.

After the solids have traversed the length of the reactor, they are discharged therefrom by means of discharge screw conveyor 51. As best shown in Fig. 4, solids are introduced into such conveyor by means of a special baffle plate 61 which, together with a substantially vertical portion 62 of inner wall 27 forms a hopper 63 which leads into an upwardly facing opening 64 in conveyor 51. It will be noted (Fig. 1) that discharge hopper 63 is located adjacent the discharge end of the reactor and extends only a short distance inwardly thereof.

As solids travel through the reactor as above described, their path or course is generally spiral shaped and they eventually reach a point adjacent the discharge end where lifters 28, after moving them through confining section 26, drop them into hopper 63 whence conveyor 51 will move them to final discharge through a downwardly facing outlet 65 into a press or other receptacle 66 for further handling or processing. In order to prevent localized high gas velocities in discharge hopper 63, baffle 61 may also be perforated to permit gas passage. Thus, it is seen that longitudinal lifters 28 confine and convey successive portions of a mass of solids through confining section 26 and that such portions are subsequently released from confinement, a portion of such released portion falling to the bottom of chamber 22 for recycle while the remainder of such released portions fall into hopper 63 and are discharged as treated solids.

It will be noted that confining section 26 maintains the solids in a layer of uniform depth as they pass over the wind box 19. Consequently gas passage through the confined mass of solids cannot be affected by variations in bed depth. To control gas distribution into wind box 19 from gas supply conduit 16, a series of louvres or flap valves 67 may be employed and operated by suitable control arms 68 to vary gas flow through each of the individual gas inlet ports 21 into wind box 19. Thus, if it is desired to admit more or less gas into any given portion of the wind box, to maintain uniform gas distribution it can be done by suitable regulation of louvres 67.

In this connection, if a more exact control over gas quantities in different sections of the reactor is desired, it may be attained by partitioning wind box 19 into several independent sections 69. Such partitioning may be simply accomplished by means of divider or partition strips 70 (Figs. 1-4) fastened to outer shell 11 at one edge and having a resilient deckle member 71 at its inner edge bearing against perforated wall 23 to form a seal. Such dividers extend transversely of the wind box to thus divide it into individual sections 69 so that regulation of gas input by louvres 67 will result in more precise control over reaction conditions in any given part of the reactor.

The above described wind box dividers need not be employed in all cases but are of special usefulness in cases where distinct reactions are to be carried out in different portions of the reactor, or where progressively changing temperatures are employed as would be the case in some drying operations where gas temperatures are gradually decreased during operation to prevent burning of solids after they have substantially given up their moisture content. Another instance where such a divided wind box might be employed is the case where the physical characteristics of the solids change thus changing resistance of the bed to gas flow.

A modification of the invention especially useful under such conditions is shown in Fig. 9 which illustrates a dryer similar to that of Figs. 1-7, but having a plurality of independent gas supply conduits 16 instead of a common manifold. With such independent gas supply conduits, each wind box section 69 may be supplied with a gas of different temperature or composition, or both, to carry out a multi-stage treatment in the reactor. In this connection, it is to be understood that the treatment gases may be supplied from any convenient suitable source as is conventional in gas solids contacting. For instance, hot gases for drying may be hot products of combustion from a furnace 72 (Fig. 8) or may be atmospheric air heated indirectly by heating coils or other means. Treatment gases ($O_2$, $N_2$ etc.) other than drying gases may also be supplied from any suitable source as is well known.

Control as to the quantity and velocity of supplied gases is attained by use of a conventional blower 73 in correlation with louvres 67 or other throttling means. In this connection, if the modification of Fig. 9 is employed, then each supply conduit 16 will have its own blower (not shown) which may be used to supply gases of different composition or temperatures. For instance, the solids may first be heated with hot air then contacted with oxygen, $CO_2$ or other gas to carry out a desired reaction.

Although not described in detail herein, it is to be understood that the various structural components of the reactor may be of any suitable design for carrying out their desired purpose. For instance, inner perforated wall 27 may be supported by suitable transverse braces 74 and longitudinal support members 76.

Fig. 8 illustrates a particular system embodying the reactor of the present invention as a dryer in the processing of fresh coconut meat to produce oil and oil-free meal.

The system illustrated comprises an inspection table 77 where freshly shelled coconuts are inspected. A screw feed conveyor 78 and elevator 79 which transfer coconut meat into a suitable slicer 54 where it is sliced into thin slices and introduced into a dryer 10 of the type shown in Figs. 1-6.

Coconut meat is dehydrated in the dryer by contact with hot air from furnace 72 introduced into the reactor through manifold 16. After drying, the solids are discharged into screw conveyor 81 which introduces them into a suitable screw press 82 for removal of oil.

From press 82, oil is discharged via conduit 83 to a settling tank 84 for separation of larger solid impurities. Such separated solids are recycled via screw conveyor 85 to press 82. A portion of oil is also recycled from tank 84 via conduit 84' to press 82 for use as a coolant in known manner. The remaining portion of oil is transferred via conduit 86 to a suitable filter 87 where it is finally purified, thence transferred to a deodorizing tank 88 and finally discharged as product via conduit 89. Oil-free meal is discharged from press 82 via a suitable screw conveyor 91 to a cooler 92 thence via conduit or other transfer means 93 to pulverizer 94 and finally to discharge or other processing via conduit 95.

The various components of the system are driven in conventional manner by suitable motors such as at 96, and 97.

The dryer of this invention is particularly well suited for the continuous processing of coconuts in a system such as above described because, due to its high contacting efficiency, it is capable of continuously drying large quantities of coconut meat to a moisture content of less than 5% by weight in a relatively short time, thus maintaining high output rates of high quality product. In a test installation, a dryer twelve feet long and having a cylindrical perforated wall 4 feet in diameter was used. Such perforated outer wall 23, as well as the portion of inner wall 27 defining one side of section 26, was made of metal sheet or screen with closely spaced $\frac{1}{16}$ inch openings. The inner or vertical portion 62 of wall 27 was provided with ($\frac{1}{8}$ inch) apertures to insure that any fine solids that might be carried from section 26 through the smaller apertures would pass through such wall section 62 into the interior of chamber 22.

In the described dryer, gases at 250° F. and a pressure of about 2½ inches of water were supplied at an approximate rate of 22,000 c.f.m. The area of confined section 26 in communication with wind box 19 was about 76 square feet and the resulting gas velocities through such section was approximately 290 feet per minute.

Under these conditions, fresh elongated coconut meat slices 1 to 3 inches long and about 1/32 inch thick and initially containing 48%–50% moisture by weight were dried to a moisture content of only 2% to 3% by weight, at a capacity of 2700 to 3000 pounds of fresh meat per hour.

Even though the gas temperatures were as high as 250° F., which usually causes burning of coconut meats having less than about 8% moisture, the rapid drying made possible by the apparatus of the present invention prevented such burning, and the oil and meal were both unburned. Also, it is to be noted that even though the gas velocities were as high as 290 feet per minute, there was very little loss of the light coconut pieces due to abrasion or entrainment.

Obviously, the invention may be employed to treat materials other than coconut and will for instance be very useful in drying other vegetables and fruits such as carrots, apples and the like. Also, if desired the invention contemplates the use of a vacuum system for drawing air or other treatment gases through the mass of solids in the reactor. This may be of particular advantage in operations such as drying where a reduced pressure on the solids will promote the desired treatment.

We claim:

1. Apparatus for contacting solids with gases comprising a housing, a first elongated gas permeable wall in said housing spaced therefrom to provide a plenum space therebetween, said wall forming a horizontally extending cylinder and being mounted for rotation about its longitudinal axis; a second elongated gas permeable wall fixedly mounted within said housing in spaced apart substantially parallel relationship with the inner surface of said cylinder substantially along the length thereof and between a lower and upper portion of its periphery whereby there is defined a solids confining section adjacent one side of said housing having a lower solids inlet and an upper solids outlet; feeder means enabling the supply of solids to said lower inlet adjacent one end of said cylinder; means adjacent said upper solids outlet at the opposite end of said cylinder enabling removal from said housing of solids discharged from said outlet; means for conveying successive portions of solids in close confinement from said lower inlet through said confining section for release at said upper outlet, comprising a plurality of spaced apart longitudinally extending slat members, each of said members being secured to the inner surface of said cylinder for rotation therewith and extending inwardly therefrom; and means for directing a continuous flow of gas through said confining section through the gas permeable wall of said cylinder, said plenum space having its boundary edges adjacent said wall in sealed relationship therewith, and means remote from said confining space enabling the discharge of gases from said housing.

2. Apparatus for contacting solids with gas comprising a housing, a rotatable apertured cylinder within said housing and spaced laterally from a wall thereof to provide a plenum space, sealing means between an upper portion of said wall and said cylinder and sealing means between a lower portion of said wall and said cylinder to confine flowing gas in said plenum space and cause said gas to flow transversely through said cylinder, an arcuate fixed perforated wall adjacent substantially one side only of said cylinder substantially concentric therewith to provide a generally upright confined arcuate path at substantially only said one side of said cylinder and through which the gas can flow transversely, spaced apart lifting members fixed to the inner surface of said cylinder for rotation therewith, said lifting members extending inwardly of said cylinder substantially the length thereof with their free ends relatively closely adjacent said arcuate perforated wall to move said solids in a confined condition through said path at said one side of said cylinder and cause said solids to shower by gravity from an upper portion of said path through said gas flowing transversely through said cylinder, and means for continuously introducing solids into said cylinder and discharging treated solids therefrom.

References Cited in the file of this patent
UNITED STATES PATENTS

| | | |
|---|---|---|
| 565,522 | Stucky | Aug. 11, 1896 |
| 668,584 | Puff et al. | Feb. 19, 1901 |
| 2,119,916 | Huse | June 7, 1938 |
| 2,412,763 | Baker | Dec. 17, 1946 |
| 2,424,229 | Erisman | July 22, 1947 |
| 2,499,157 | Peirce | Feb. 28, 1950 |

FOREIGN PATENTS

| | | |
|---|---|---|
| 11,154 of 1887 | Great Britain | July 20, 1888 |
| 101,575 | Germany | Feb. 14, 1899 |
| 228,534 | Germany | Nov. 11, 1910 |